(12) United States Patent
Baumgardner et al.

(10) Patent No.: US 11,138,259 B2
(45) Date of Patent: Oct. 5, 2021

(54) OBTAINING DETAILS REGARDING AN IMAGE BASED ON SEARCH INTENT AND DETERMINING ROYALTY DISTRIBUTIONS OF MUSICAL PROJECTS

(71) Applicant: MUSO.AI INC., North Hollywood, CA (US)

(72) Inventors: Jay Baumgardner, Studio City, CA (US); Aaron Kaufman, Miami, FL (US); Kyran Phillip de Keijzer, Glendale, CA (US)

(73) Assignee: MUSO.AI INC., North Hollywood (CA)

( * ) Notice: Subject to any disclaimer, the term of this patent is extended or adjusted under 35 U.S.C. 154(b) by 315 days.

(21) Appl. No.: 16/203,137

(22) Filed: Nov. 28, 2018

(65) Prior Publication Data
US 2019/0163700 A1    May 30, 2019

Related U.S. Application Data

(60) Provisional application No. 62/591,324, filed on Nov. 28, 2017.

(51) Int. Cl.
*G06F 16/00* (2019.01)
*G06F 16/583* (2019.01)
(Continued)

(52) U.S. Cl.
CPC ...... *G06F 16/5854* (2019.01); *G06F 16/4387* (2019.01); *G06F 16/9032* (2019.01);
(Continued)

(58) Field of Classification Search
CPC ............. G06F 16/5854; G06F 16/9032; G06F 16/9035; G06F 16/9532; G06F 16/4387; G06F 16/9538
See application file for complete search history.

(56) References Cited

U.S. PATENT DOCUMENTS 7,644,273 B1    1/2010  Stebbings
10,140,515 B1 * 11/2018 Waldo .................. G06K 9/6273
(Continued)

OTHER PUBLICATIONS

Notice of Allowance dated Aug. 12, 2020 in related U.S. Appl. No. 15/947,002, 7 pages.
(Continued)

*Primary Examiner* — Alexander Khong
(74) *Attorney, Agent, or Firm* — Andrew M. Calderon; Roberts Calderon Safran & Cole, P.C.

(57) ABSTRACT

The present disclosure generally relates to obtaining details regarding an image based on search intent and, further, to determining royalty distributions of musical projects. In an example, a computer-implemented method includes: receiving, by a computing device, an image as part of a request to receive information regarding an object in the image, wherein the image is received via an application hosted by a user device; identifying, by the computing device, the object in the image; determining, by the computing device, a user intent based on identifying the object; executing, by the computing device, the search query, wherein the executing includes accessing one or more blockchain-based databases storing metadata; and returning, by the computing device, results to the search query, wherein the returning the results includes presenting the search results within the application and overlaid on or around the image within a user interface of the user device.

19 Claims, 4 Drawing Sheets

(51) Int. Cl.

| | |
|---|---|
| *G06F 16/9532* | (2019.01) |
| *H04L 9/06* | (2006.01) |
| *G06F 16/438* | (2019.01) |
| *G06F 16/9538* | (2019.01) |
| *G06Q 30/00* | (2012.01) |
| *G06F 16/9032* | (2019.01) |
| *G06F 16/9035* | (2019.01) |

(52) U.S. Cl.
CPC ...... *G06F 16/9035* (2019.01); *G06F 16/9532* (2019.01); *G06F 16/9538* (2019.01); *G06Q 30/00* (2013.01); *H04L 9/0637* (2013.01)

(56) References Cited

U.S. PATENT DOCUMENTS

| | | |
|---|---|---|
| 2002/0049738 A1 | 4/2002 | Epstein |
| 2004/0024688 A1* | 2/2004 | Bi .......................... G06Q 40/04 705/37 |
| 2006/0180007 A1 | 8/2006 | McClinsey |
| 2008/0004120 A1* | 1/2008 | Van Luchene .......... G07F 17/32 463/42 |
| 2008/0246850 A1 | 10/2008 | Marlowe |
| 2009/0271283 A1 | 10/2009 | Fosnacht et al. |
| 2010/0235741 A1 | 9/2010 | Newman et al. |
| 2012/0197785 A1 | 8/2012 | Cooper et al. |
| 2013/0283203 A1* | 10/2013 | Batraski ................ G06F 16/438 715/783 |
| 2014/0325408 A1* | 10/2014 | Leppanen ............. G06F 3/0481 715/765 |
| 2015/0032769 A1* | 1/2015 | Rose .................... G06F 16/4387 707/769 |
| 2015/0082338 A1 | 3/2015 | Logan |
| 2015/0200977 A1 | 7/2015 | Wait |
| 2015/0287153 A1 | 10/2015 | Kankanala et al. |
| 2015/0347848 A1* | 12/2015 | Gurovich ........... G06K 9/00677 382/104 |
| 2016/0300043 A1 | 10/2016 | Bi et al. |
| 2016/0350333 A1* | 12/2016 | Sacheti ................ G06F 3/0481 |
| 2016/0358161 A1 | 12/2016 | Cobban et al. |
| 2017/0300495 A1* | 10/2017 | Sharifi .............. G06F 16/90335 |
| 2018/0025004 A1 | 1/2018 | Koenig |
| 2018/0039942 A1* | 2/2018 | Rogers .................... G06F 16/48 |
| 2018/0041571 A1 | 2/2018 | Rogers et al. |
| 2018/0189390 A1 | 7/2018 | Cremer et al. |
| 2019/0028278 A1 | 1/2019 | Gilson |
| 2020/0226152 A1* | 7/2020 | Raichelgauz .......... H04H 60/46 |

OTHER PUBLICATIONS

Office Action dated Jan. 17, 2020 in related U.S. Appl. No. 15/947,002, 19 pages.

Final Office Action dated May 8, 2020 in related U.S. Appl. No. 15/947,002, 35 pages.

\* cited by examiner

OBTAINING DETAILS REGARDING AN IMAGE BASED ON SEARCH INTENT AND DETERMINING ROYALTY DISTRIBUTIONS OF MUSICAL PROJECTS

BACKGROUND

The present invention generally relates to obtaining details regarding an image based on search intent and, further, to determining royalty distributions of musical projects.

SUMMARY

In an aspect of the invention, a computer-implemented method comprises: receiving, by a computing device, an image as part of a request to receive information regarding an object in the image, wherein the image is received via an application hosted by a user device; identifying, by the computing device, the object in the image; determining, by the computing device, a user intent based on identifying the object, wherein the determining the user intent is based on at least one selected from the group consisting of: search trends associated with the object, attributes of the object, a type of the object, and a condition of the object; generating, by the computing device, a search query based on the identifying the object and the user intent; executing, by the computing device, the search query, wherein the executing includes accessing one or more blockchain-based databases storing metadata; and returning, by the computing device, results to the search query, wherein the returning the results includes presenting the search results within the application and overlaid on or around the image within a user interface of the user device.

In further aspects of the invention, a computer-implemented method comprises: accessing, by a computing device, a blockchain-based database storing metadata identifying a plurality of contributors for a musical project; determining, by the computing device, royalty distributions for the plurality of contributors based on one at least one selected from the group consisting of: smart contracts stored in the blockchain-based database; a percentage or division split to the contributors; documentation on fee for services used in the musical project; information identifying which of the plurality of contributors should be paid a first amount of a total amount; information identifying a time period that a particular contributor of the plurality of contributors is to receive royalties; and providing, by the computing device, information regarding the royalty distributions.

In another aspect, a computer program product for generating a playlist is provided. The computer program product comprising a computer readable storage medium has program instructions embodied therewith. The program instructions are executable by a computing device to cause the computing device to: search one or more databases for vendor specific metadata; match the vendor specific metadata to relationships of the user; and generating an audience specific marketing playlist using the matched vendor specific metadata.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to obtaining details regarding an image based on search intent and, further, to determining royalty distributions of musical projects. An image search application may identify an object in an image captured or stored by a user device (e.g., smartphone, tablet, laptop/desktop computer, etc.), perform a web search of the identified object, and return search results to the user. In addition to performing a web search based on a search query that includes words describing the identified object, aspects of the present invention may determine an intent of the user based on an image in order to return more relevant search results rather than results returned from a generic web search.

As an example, aspects of the present invention may search one or more external data servers to identify search trends from social media platforms, search engines, newsfeeds, etc. to better identify the intent of an image based search. For example, if a search for a particular object is trending, aspects of the present invention may identify the types of webpages that other users are accessing in relation to the object. Accordingly, when a search for the particular object is subsequently executed, aspects of the present invention may return search results (e.g., webpages) that are based on searching trends, thereby providing more relevant search results to the user.

In embodiments, aspects of the present invention may execute logic to identify the intent of the user in an image based search based on the attributes of objects in the image (e.g., the type of object, the condition of the object, etc.) or the context of which the image was found, identified, etc. As an example, if the image includes a machine or apparatus (e.g., a musical production device found in a recording studio), aspects of the present invention may determine that the image includes a machine and thus the intent of the search is to obtain operating instructions for the machine or apparatus. Accordingly, aspects of the present invention may execute a search for operating instructions for the machine. As another example, if the image includes a broken object, aspects of the present invention may determine that the intent of the search is to obtain repair instructions based on the image being of a broken object that the user may wish to repair.

In embodiments, aspects of the present invention may generate a search query that includes words describing the object as well as the intent of the search query, provide the search query to a search application, and return search results. As an example, aspects of the present invention may generate a search query having the words: "operating instructions for Roland JD-XA synthesizer" based on recognizing the model of the object in the image, a type of image, and other data relating to the intent of the search (e.g., social media posts, search tends, etc.). As such, aspects of the present invention may generate a search query that includes a description of an object in the image, as well as the intent of the search. Also, the search query may include additional parameters, such as a particular group of web domains to search based on the intent of the search.

In embodiments, aspects of the present invention may return search results that are based on a rich set of metadata associated with an object identified in an image. For example, if the image includes an object of a guitar, aspects of the present invention may identify a rich set of metadata associated with the guitar from a database (e.g., a blockchain-based database), such as a make/model of the guitar, famous artists that have used the guitar, published songs in which the guitar was used to record the song, etc. Further, additional details can be explored, such as additional metadata regarding the song in which the guitar was used (e.g., lyrics of the song, individuals that contributed to the song, royalty distributions regarding the song, etc.).

In the musical field, musical projects and songs are produced by a team having various contributors (e.g., musicians, artists, producers, sound technicians, record label personnel, etc.). When a musical project is monetized, royalties are often split among the individual contributors. The rich set of metadata may also be used to divide royalties for songs across project contributors. For example, royalty payments may be based on distribution rules, such as:

- Smart contracts stored in the blockchain-based database of rich set of metadata
- A percentage or division split to contributors involved in a project
- Documentation on fee for services used in the project (e.g., work for hire musicians)
- First to be paid (e.g., Person X receives the first $10,000 and any amount greater is split among others into a remainder percentage)
- Recouping (e.g., Person X receives the first $10,000 and any amount greater is split among person X and others into a remainder percentage)
- Close Account Out (e.g., Person X receives royalties for a period of time and is then removed from future royalties, which may be used for promoters and/or marketing).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the Figures illustrate the architecture, functionality, and operation of possible implementations of systems, methods, and computer program products according to various embodiments of the present invention. In this regard, each block in the block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
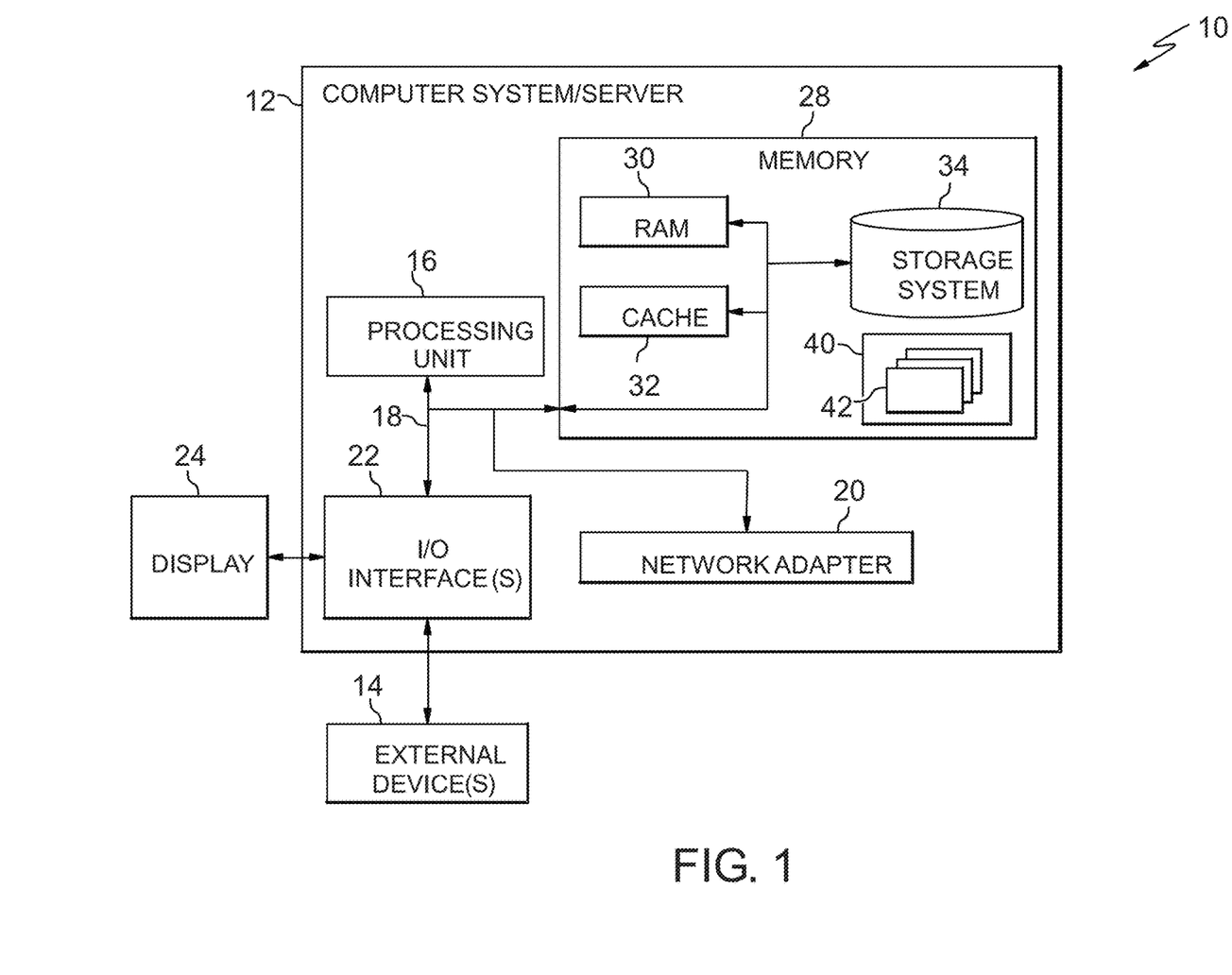
FIG. 1 shows an illustrative environment for managing the processes in accordance with aspects of the invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
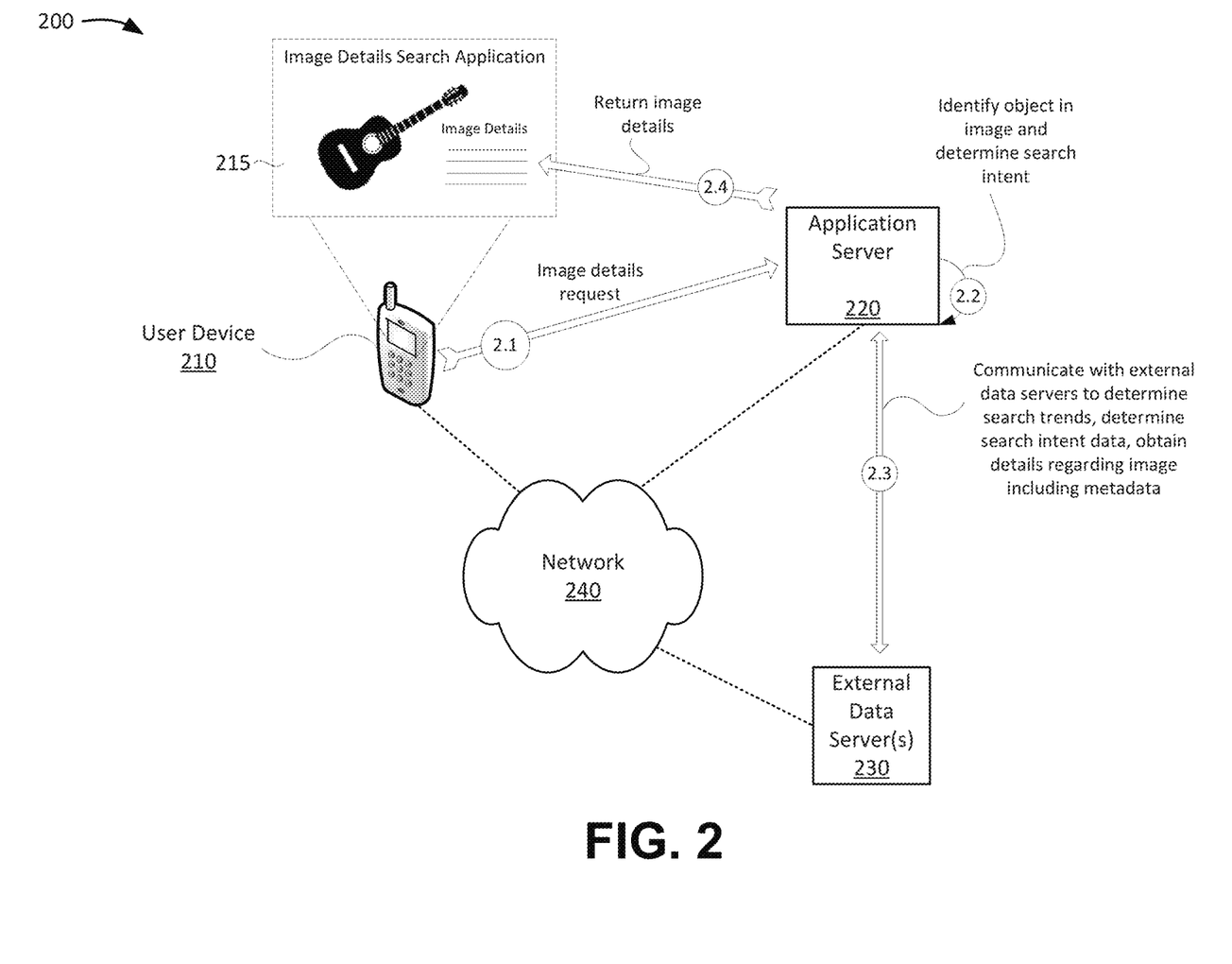
FIG. 2 shows an overview of an example implementation in accordance with aspects of the present invention.

FIG. 2 shows an overview of an example implementation and environment 200 in accordance with aspects of the present invention. As shown in FIG. 2, environment 200 may include a user device 210, an application server 220, and one or more external database servers 230 which may all communicate via a network 240. As shown in FIG. 2, the user device 210 may host a search application (e.g., in interface 215) whereby a user may capture an image of an object and request details regarding the image. In the example shown, the user may use the user device 210 to capture an image of a guitar and request details regarding the image. In alternative embodiments, the image can be any captured metadata for film, television, video games and other forms of media as described herein.

At step 2.1, the user device 210 may request image details (e.g., perform an image details search) by providing a request to an application server 220. At step 2.2, the application server 220 may identify an object in the image (e.g., the guitar, the type of guitar, model of the guitar, etc.) and may determine an intent of the search or image details request. For example, at step 2.3, the application server 220 may communicate with one or more external database servers 230 to determine search trends associated with the object, and obtain other data relating to the intent of the user's search (e.g., based on the attributes of the object in the image, type of object in the image, etc.).

In embodiments, the application server 220 may generate a search query that describes the object, the intent of the search, and/or domains or webpages to search based on the intent of the search. The application server 220 may communicate with the one or more external database servers 230 to obtain search results based on the query, including a rich set of metadata (e.g., from a blockchain-based database) associated with the object in the image. At step 2.4, the application server 220 may return image details which may be overlaid on top of the image captured by the user within the user interface 215. For example, the details may be overlaid on top of the image, to the left of the image, to the right of the image, over the image, under the image, and/or text wrapped around the image.

In embodiments, the search operations provided by the application server 220 may be provided by a content or search provider or other third party to be used as a service. The provider may include, for example, a product manufacturer (e.g., of musical equipment, consumer electronics, automobiles, personal items, etc.), a music production company, a content streaming service provider, or the like.

As an illustrative example, the application server 220 may obtain a rich set of metadata associated with the guitar from a database (e.g., a blockchain-based database), such as a make/model of the guitar, famous artists that have used the guitar, published songs in which the guitar was used to record the song, etc. Further, additional details can be explored, such as additional metadata regarding the song in which the guitar was used (e.g., lyrics of the song, individuals that contributed to the song, royalty distributions regarding the song, etc.).

The rich set of metadata may also be used to divide royalties for songs across project contributors. For example, royalty payments may be based on distribution rules, such as:
  Smart contracts stored in the blockchain-based database of rich set of metadata (which can be representative of the storage system of FIG. 1);
  A percentage or division split to contributors involved in a project;
  Documentation on fee for services used in the project (e.g., work for hire musicians);
  First to be paid (e.g., Person X receives the first $10,000 and any amount greater is split among others into a remainder percentage);
  Recouping (e.g., Person X receives the first $10,000 d any amount greater is split among person X and others into a remainder percentage); and/or
  Close Account Out (e.g., Person X receives royalties for a period of time and is then removed from future royalties, which may be used for promoters and/or marketing).

As shown in FIG. 2, the user device 210, the application server 220, and the external data servers 230 may communicate via the network 240. The network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Figure 3:
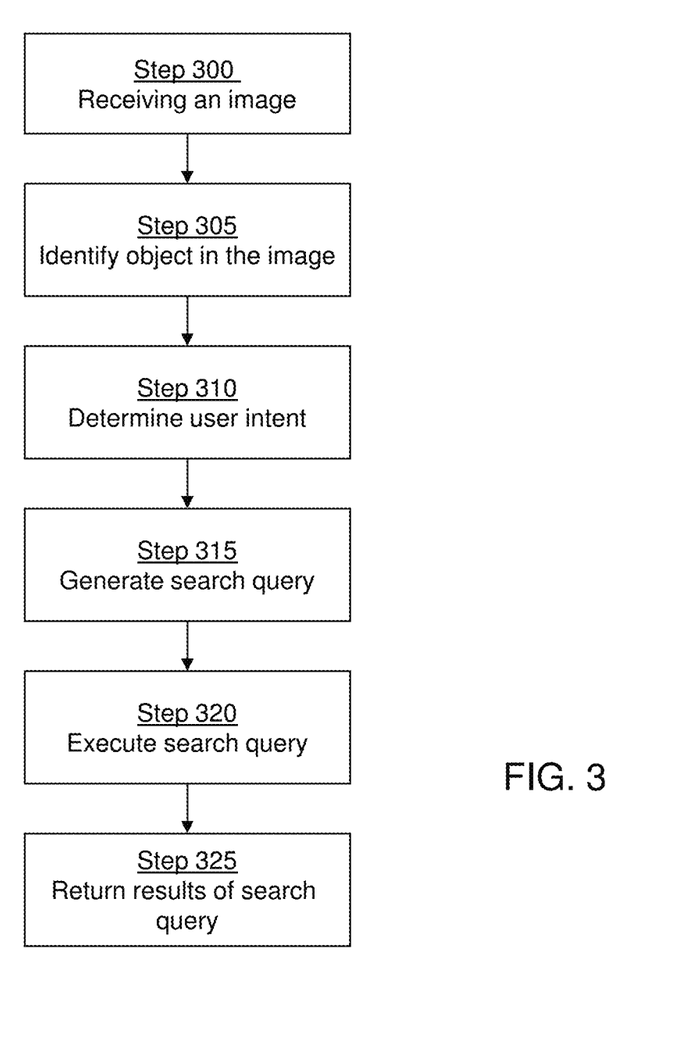
FIGS. 3-5 show flow diagrams implementing example embodiments in accordance with aspects of the present invention.
Figure 4:
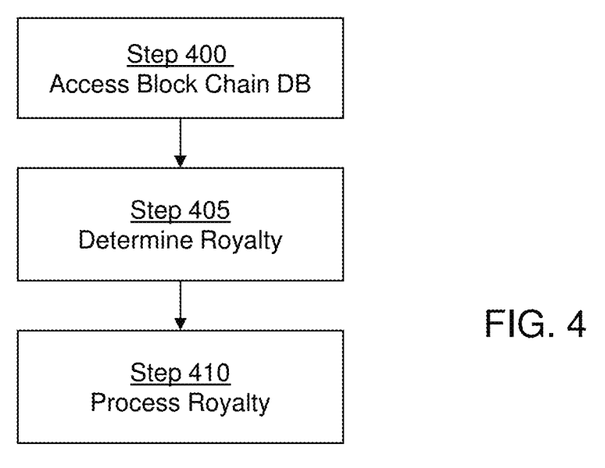
Figure 5:
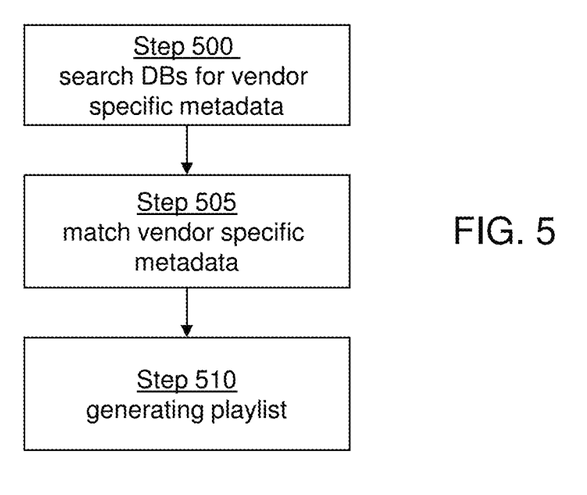

FIGS. 3-5 show flow diagrams implementing example embodiments in accordance with aspects of the present invention. The flowchart illustrates the architecture, functionality, and operation of possible implementations of systems, methods, and computer program products according to various embodiments of the present invention including being implemented in the computing node 10 of FIG. 1. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustration, and combinations of blocks in the block diagrams and/or flowchart illustration, can be implemented by special purpose hardware-based systems that perform the specified functions or acts or carry out combinations of special purpose hardware and computer instructions.

More particularly, FIG. 3 shows at step 300, receiving, by a computing device, an image as part of a request to receive information regarding an object in the image, wherein the image is received via an application hosted by a user device. In embodiments, the object can be from any database which stores information about media, e.g., film, television, video games, virtual reality, augmented reality, etc. and other forms of media as described herein. At step 305, the processes identify, by the computing device, the object in the image, e.g., guitar or other hardware or equipment. At step 310, the processes determine, by the computing device, a user intent based on identifying the object, wherein the determining the user intent is based on at least one selected from the group consisting of: search trends associated with the object, attributes of the object, a type of the object, and a condition of the object. At step 315, the processes generate, by the computing device, a search query based on the identifying the object and the user intent. At step 320, the processes execute, by the computing device, the search query, wherein the executing includes accessing one or more blockchain-based databases storing metadata associated with any of the objects described herein. At step 325, the processes return, by the computing device, results to the search query, wherein the returning the results includes presenting the search results within the application and overlaid on or around the image within a user interface of the user device.

In FIG. 4, at step 400, the processes access, by a computing device, a blockchain-based database storing metadata identifying a plurality of contributors for a musical project. At step 405, the processes determine, by the computing device, royalty distributions for the plurality of contributors based on one at least one selected from the group consisting of: smart contracts stored in the blockchain-based database; a percentage or division split to the contributors; documentation on fee for services used in the musical project; information identifying which of the plurality of contributors should be paid a first amount of a total amount; information identifying a time period that a particular contributor of the plurality of contributors is to receive royalties. At step 410, the processes provide, by the computing device, information regarding the royalty distributions.

In further embodiments, the systems and processes described herein provide the ability to generate audience specific marketing playlists. For example, using the features described with respect to FIGS. 1-5, with the data gathered using the systems and processes described herein, it is now possible to generate musical playlists for the marketing purposes of brands. By way of example, Gibson guitar manufacturer can now sponsor a playlist on a music streaming service that has the top 10 songs with one of their guitars, or a School like Berkley School of Music sponsoring a playlist that contains the songs of top drummers that went to their school. Accordingly, with the metadata captured, it is now possible to match this data to songs in existing music players through relations, and have the ability to, for the first time, use music playlists in digital marketing. These types of actions can be done by capturing the metadata as described herein.

In further embodiments, the systems and processes described herein can expand the metadata capture from music projects to entertainment projects. With capturing metadata there is no need to limit it to only the music industry, as it is possible now capture metadata for film, television, video games and other forms of media (including virtual reality (VR) and augmented reality (AR)). Overall the systems and processes described herein is capable of capturing the necessary metadata within entertainment projects for royalty purposes, but in general also recognition, contract payment (e.g., did this person really work on this project), and building of the user's resume.

In embodiments, the use of film gear and video game gear can be used to capture additional information similar to that of the musical instruments for music projects. This should not be limited to only film and video game gear, but also other types of hardware. For example, Take, for example, hardware AR glasses worn by the user to see digital creations embedded in the real world can be captured. Accordingly, it is now possible to use such devices in additional to musical instruments to capture metadata for AR projects.

More specifically, the implementation shown in FIG. 5 shows a flowchart which can be a computer program product for generating a playlist. The computer program product comprises a computer readable storage medium (non-transitory) having program instructions embodied therewith. The program instructions are executable by a computing device (e.g., computing node 10 of FIG. 1) to cause the computing device to: search one or more databases for vendor specific metadata; match the vendor specific metadata to relationships of the user; and generating an audience specific marketing playlist using the matched vendor specific metadata. The database can be a blockchain-based database. The vendor specific metadata obtained from multimedia. The multimedia is one of music, film, television, video games, virtual reality and augmented reality. The vendor specific metadata is a hardware device, which be a musical instrument, for example.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, an image as part of a request to receive information regarding an object in the image, wherein the image is received via an application hosted by a user device;
identifying, by the computing device, the object in the image;
determining, by the computing device, a user intent based on identifying the object, wherein the determining the user intent is based on at least one selected from the group consisting of:
search trends associated with the object,
attributes of the object,
a type of the object, and
a condition of the object;
generating, by the computing device, a search query based on the identifying the object and the user intent;
executing, by the computing device, the search query, wherein the executing includes accessing one or more blockchain-based databases storing metadata; and
returning, by the computing device, results to the search query, wherein the returning the results includes presenting the search results within the application and overlaid on or around the image within a user interface of the user device,
wherein the user intent is based on a physical condition of the object.

2. The method of claim 1, which is implemented using a computer program product, the computer program product includes a non-transitory computer usable storage medium having program code embodied in the storage medium, which the program code is readable/executable by the computing device to implement the steps of claim 1.

3. The method of claim 1, wherein the computing device is a computer system which includes a CPU, a computer readable memory and a computer readable storage medium, the computer system includes one or more program instructions operable to perform the steps of claim 1, the program instructions are stored on the computer readable storage medium for execution by the CPU via the computer readable memory.

4. A computer-implemented method comprising:
accessing, by a computing device, a blockchain-based database storing metadata identifying a plurality of contributors for a musical project;
determining, by the computing device, royalty distributions for the plurality of contributors based on information identifying a first time period that a particular contributor of the plurality of contributors is to receive royalties, and a second time period, following the first time period, that another contributor of the plurality of contributors is to receive royalties;
providing, by the computing device, information regarding the royalty distributions;
displaying an image of an object on a user interface relating to a performance produced by the musical project; and
displaying the information regarding the royalty distribution overlaid on or around the image within the user interface of the user device.

5. The method of claim 4, which is implemented using a computer program product, the computer program product includes a non-transitory computer usable storage medium having program code embodied in the storage medium, which the program code is readable/executable by the computing device to implement the steps of claim 4.

6. The method of claim 4, wherein the computing device is a computer system which includes a CPU, a computer readable memory and a computer readable storage medium, the computer system includes one or more program instructions operable to perform the steps of claim 4, the program instructions are stored on the computer readable storage medium for execution by the CPU via the computer readable memory.

7. A computer program product for generating a playlist, the computer program product comprising a computer readable storage medium having program instructions embodied therewith, the program instructions are executable by a computing device to cause the computing device to:
search one or more databases for vendor specific metadata pertaining to recording of performances using an object displayed on a user interface;
match the vendor specific metadata to relationships of a user of the user interface; and
generate an audience specific marketing playlist, which includes at least a plurality of the performances in which the displayed object was utilized, using the matched vendor specific metadata,
wherein the specific marketing playlist includes the plurality of performances listed in accordance with a predetermined criteria.

8. The computer program product of claim 7, wherein the vendor specific metadata is obtained from multimedia.

9. The computer program product of claim 7, wherein the multimedia is one of music, film, television, video games, virtual reality and augmented reality.

10. The computer program product of claim 7, wherein the vendor specific metadata indicates a hardware device which is the displayed object.

11. The computer program product of claim 10, wherein the hardware device is a musical instrument.

12. The computer program product of claim 11, wherein the playlist pertains to songs in which the musical instrument was used to record the song.

13. The computer-implemented method of claim 1, wherein the user intent is determined by search trends of other users of the object.

14. The computer-implemented method of claim 13, wherein the search trends of others are webpages accessed by the other users.

15. The computer-implemented method of claim 1, wherein the user intent is based on attributes or type of the object.

16. The computer-implemented method of claim 1, wherein the user intent is based on a context in which the object is found in the image.

17. The computer-implemented method of claim 1, wherein the user intent is based on the physical condition of the object.

18. The computer-implemented method of claim 17, wherein the search results include at least one of operating instructions or repair instructions regarding the object based on the physical condition of the object.

19. The computer-implemented method of claim 4, further comprising determining, by the computing device, royalty distributions for the plurality of contributors based on one at least one selected from the group consisting of:
  smart contracts stored in the blockchain-based database;
  a percentage or division split to the contributors;
  documentation on fee for services used in the musical project;
  information identifying which of the plurality of contributors should be paid a first amount of a total amount.

* * * * *